United States Patent [19]

Zaveri et al.

[11] Patent Number: 4,865,250
[45] Date of Patent: Sep. 12, 1989

[54] AUTOMOTIVE OIL LEVEL CONTROL VALVE APPARATUS

[75] Inventors: Narendra R. Zaveri; Henry Ty, both of Attleboro, Mass.; Alfred J. White, North Providence, R.I.

[73] Assignee: Texas Instruments Incorporated, Dallas, Tex.

[21] Appl. No.: 264,288

[22] Filed: Oct. 28, 1988

[51] Int. Cl.[4] ............................................. G05D 23/08
[52] U.S. Cl. ............................. 236/93 R; 236/101 E; 137/535; 267/47; 267/158; 267/262
[58] Field of Search ............ 236/93 R, 101 R, 101 E; 137/535; 267/47, 158, 163, 260, 262

[56] References Cited

U.S. PATENT DOCUMENTS

| | | | |
|---|---|---|---|
| 1,583,303 | 5/1926 | Mertz | 236/93 R X |
| 1,933,318 | 10/1933 | Doer | 236/101 E X |
| 1,963,101 | 6/1934 | Sawtelle | 267/158 X |
| 2,848,574 | 8/1958 | Hutt et al. | 267/163 X |
| 3,513,881 | 5/1970 | Kinsell | 236/93 R X |
| 4,781,575 | 11/1988 | Ferri et al. | 236/93 R X |

*Primary Examiner*—William E. Tapolcad
*Attorney, Agent, or Firm*—John A. Haug; James P. McAndrews; Melvin Sharp

[57] ABSTRACT

A fluid level control valve has a base with an aperture formed therein. A cover is slidingly disposed over the aperture and is biased by a thermostatic element in a direction tending to close the aperture. The thermostatic element is an elongated strip having one end captured by tabs projecting from the base, and an opposite end is captured by a bracket formed on the base. The thermostatic element is formed with a V-shaped force imparting portion which is aligned with the cover and the position of the bracket is adjustable to place a selected force on the cover through the thermostatic element. The calibrated valve is then fixedly attached to a housing with the aperture aligned with an aperture in the housing.

7 Claims, 3 Drawing Sheets

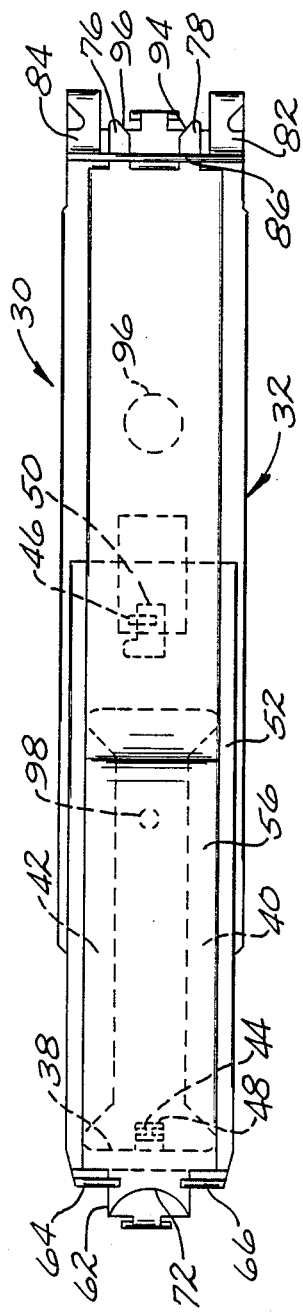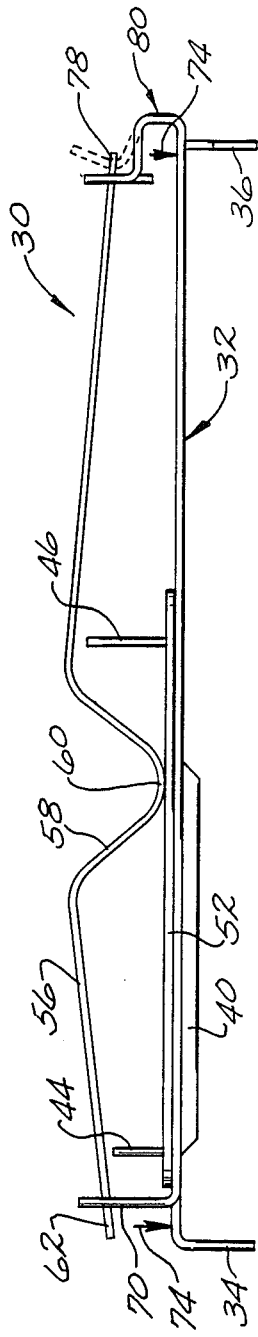

AUTOMOTIVE OIL LEVEL CONTROL VALVE APPARATUS

This application relates generally to a fluid control valve and more particularly to a temperature responsive valve for use with transmission oil reservoir.

Hydraulic pressure systems as used in motor vehicles require a supply of transmission fluid and maintaining an adequate oil level in the transmission oil pan at all operating temperatures is essential for trouble free transmission performance. Conventionally the oil pan serves as a sump to provide the necessary supply, however, in front wheel drive vehicles the transmission oil pan is too shallow to hold a suitable quantity. The problem is exacerbated by the fact that the volume of the oil used expands in the order of thirty eight percent at elevated temperatures. The problem has been dealt with by employing an auxiliary reservoir, for example, in the side of the transmission case cover. The fluid level in the auxiliary reservoir is controlled by a thermostatic element which controls the opening and closing of a cover plate in the transmission housing in response to the temperature of the oil in the auxiliary reservoir. As the temperature of the oil in the reservoir decreases the cover plate opens allowing the oil to drain into the lower sump or oil pan to maintain the desired oil level.

However, the operation of the control has been inconsistent from one transmission to another and has resulted in inadequate control of the oil level in a significant portion of the vehicles in which the transmissions are incorporated.

SUMMARY OF THE INVENTION

Accordingly, it is an object of the present invention to provide a thermostatically controlled valve which will consistently provide desired oil level control in an automotive transmission oil pan. Another object is the provision of such a control which is inexpensive and is more easily installed than conventional devices. Yet another object is the provision of a control valve which is simple yet one which is reliable and consistent as used from one transmission to another.

Other objects and features of the invention will become more readily understood from the following detailed description and drawings in which like reference numerals designate like parts throughout the figures thereof.

Briefly, in accordance with the invention, a valve assembly comprises an elongated base member having an aperture formed therein and having upstanding posts on either end of the aperture. A cover having post receiving apertures is slidingly received on the posts and is adapted to move from a position closing the aperture to a position in which the aperture is open. A thermostatic element in the form of an elongated strip has a generally V-shaped force imparting portion intermediate its ends mounted on the base with the force imparting portion aligned with the cover. One end of the strip is captured by tabs extending from one end of the base while the other end of the strip is captured by a bracket formed on the other end of the base. According to a feature of the invention the position of the bracket is adjustable by bending a pair of legs connected to a transversely extending stop member until a desired force is imparted to the cover at a selected temperature.

According to another feature of the invention a tang is formed on each end of the base and the thermostatic element is recessed at each end to provide access to the surface of the base in alignment with the tang for a tool to be used to install the control on a transmission case cover.

BRIEF DESCRIPTION OF THE DRAWINGS

FIG. 3 shows a top plan view of an oil level control valve made in accordance with the present invention;

FIG. 4 is a front elevational view of the FIG. 3 valve;

With reference to FIGS. 1 and 2, a broken away portion of a transmission case cover 10 is shown having a drain passage 12 leading to an auxiliary reservoir. A conventional control for providing an adequate supply of oil in the sump positioned below the drain passage comprises a cover plate 14 disposed over the passage 12 slidably mounted on pins 16, 18 so that the cover can move between a closed position as shown in FIG. 1 (when the vehicle is not in operation) and an opened position shown in FIG. 2. A thermostatic element 20 in the form of an elongated strip having pin receiving slots at its opposite ends is mounted on pins 18 and 22 and captured there by the bushings 17 and 23. Element 20 is formed intermediate its ends with a generally V-shaped force imparting portion 24 having apex 26 in engagement with cover plate 14. Element 20 is mounted on case cover 10 by inserting pins 18 and 22 through respective slot and hole in element 20 with pin 18 also inserted through a slot in cover plate 14) and then driving the pins into respective bores 19, 21 in the transmission case cover in an interference fit to a selected dimension "d" as shown in FIG. 1 at a selected temperature, e.g., normal room temperature. During operation oil circulates through the transmission system with the oil pushing the cover plate toward the open position against the bias of the thermostatic element. As the temperature of the oil in the auxiliary reservoir increases, its temperature is transferred to thermostatic element 20 and the force exerted by element 20 through apex 26 on cover plate 14 increases until at some elevated temperature the cover plate is nearly in a closed position as indicated by the dashed lines of cover 14 in FIG. 1. When the oil is cold, however, less force is exerted by element 20 so that the pressure exerted by the oil in passage 12 pushed cover 14 toward a regulated opened position shown in FIG. 2 allowing the oil in the auxiliary reservoir to drain into the oil sump (see arrows 28) to maintain the desired level in the sump.

Figure 1:
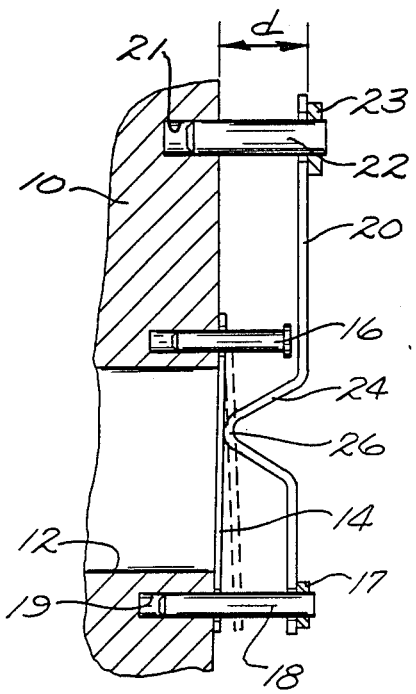
FIGS. 1 and 2 show a prior art device comprising a cover plate movably mounted over a drain aperture on the side of a transmission case cover under the control of a thermostatic element and being movable between a closed position (FIG. 1) and an opened position (FIG. 2)

Although this control works well in some installations there has been a vexing problem of inconsistency from one transmission to another affecting the performance of the control. Element 20 is a simple stamped part and its precise configuration tends to vary slightly from one part to another, however, the dimension "d" is the same for all the controls. This has resulted in a variance of up to 30% from the designed force level at a given temperature. In order to avoid the possibility of having inadequate lubrication which would result when there is insufficient oil in the sump there has been a tendency to increase the amount of oil so that in the worst case of a variance from the designed force level there is an adequate supply. However, this causes problems in units in which the control does not vary significantly from the designed level resulting in too much oil in the sump causing frothing with concomitant deleterious effects on the performance of the transmission due to the presence of air in the hydraulic system.

The control valve made in accordance with the invention overcomes this problem by providing a unit which is individually calibrated to a desired force exerted on the cover at a selected temperature with the calibrated unit then installed on the transmission case cover so that the performance of the control is consistent from one transmission to another.

With reference to FIGS. 3-6 numeral 30 designates a control valve made in accordance with the invention. A base 32 formed of suitable material such as a 400 series stainless steel is generally in the form of an elongated rectangle having downwardly depending tangs 34, 36 at respective opposite ends thereof. Base 32 is formed with an aperture 38 therethrough which generally matches that of passage 12 of the transmission case cover 10 with tangs 34, 36 respectively received in bores 19, 21 formed in housing 10. Base 32 is preferably formed with ribs 40, 42 depending therefrom along the length of aperture 38 to enhance the rigidity of the base.

First and second posts 44, 46 extend upwardly from base 32 and are slidingly received through respective apertures 48, 50 formed in a cover 52. Cover 52 is slidingly movable on posts 44, 46 in a manner similar to cover 14's movability on pins 16, 18 in FIGS. 1 and 2.

Figure 2:
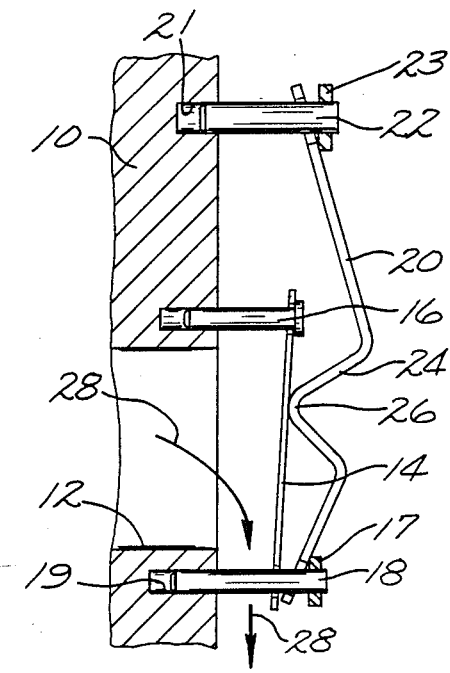

Thermostatic element 56, generally coextensive in length with base 32, is configured similar to element 20 shown in FIGS. 1 and 2 having a generally V-shaped force imparting portion 58 and apex 60 which is adapted to place a force on cover 52. However, the opposite ends of element 56 have been modified as will be explained below.

Figure 6:
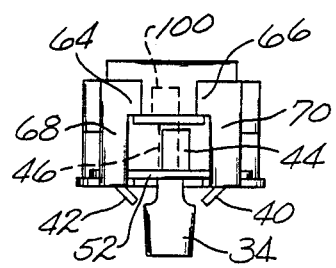
FIG. 6 is a left side elevational view of the FIGS. 3 and 4 valve.

With particular reference to FIGS. 3 and 6, end 62 of element 56 has a reduced width so that it is captured under laterally extending tabs 64, 66 which are formed on respective posts 68, 70 extending upwardly from base 32 at one end thereof. End 62 is also recessed at 72, in any suitable configuration as in the portion of a circle as shown, in order to provide access for a tool generally in alignment with the tang (see arrow 74 in FIG. 4) to facilitate installation of valve 30 on a transmission housing.

Figure 5:
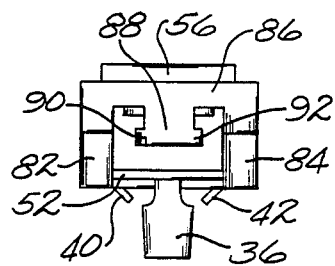
FIG. 5 is a right side elevational view of the FIGS. 3 and 4 valve.

Now with particular reference to FIGS. 3 and 5 the opposite end of element 56 is formed with two spaced fingers extending generally in the direction of the length of element 56. End 80 of base 32 is formed into a bracket with first and second legs 82, 84 extending upwardly and then back along the length of element 56 and joined together by transversely extending stop element 86. A downwardly depending generally inverted T shaped member 88 extends from element 86 and has laterally extending tabs 90, 92 formed at its lower end. Fingers 76, 78 are respectively received on either side of member 88 with transversely extending element 86 limiting upward movement of element 56 and tabs 90, 92 limiting downward movement thereof. Fingers 76, 78 are cut away at 94 and 96 respectively in a manner similar to cut out portion 72 on the opposite end of element 56 to provide access for a tool to facilitate installation of the valve on a transmission case cover. It will be seen that the tangs 34 and 36 can be conveniently driven into bores 19 and 21 of case cover 10 by a tool placed directly in line with the tangs.

Valve 30 is calibrated by placing a force measuring gauge in engagement with the underside of cover 52 aligned generally with apex 60 of element 56, and with end 62 of element 56 received under tabs 64, 66 and fingers 76, 78 received under transversely extending stop element 86. Starting from a position generally indicated by the dashed lines in FIG. 4, bracket 80 is bent in a counter clockwise direction as seen in the Figure until the selected force for a given temperature is obtained on the gauge. When this selected or caibrated force is obtained the valve is ready for installation.

Aperture 96 shown in dashed lines in FIG. 3 may be provided as a pilot hole to facilitate manufacture of the valve. Aperture 98 also shown in dashed lines is preferably provided to allow a limited amount of oil to pass through from the auxiliary reservoir to improve heat coupling of element 56 with the oil in the auxiliary reservoir.

Post 46 is preferably provided with a transversely extending tab 100 at its distal free end to limit the outward movement of cover 52.

Thus it will be seen that a simple, easily manufactured thermostatic valve is provided by the invention which is calibratable prior to installation to a specific force level and then easily installed on a transmission case cover to permit improved performance thereof. The invention permits using the proper quantity of oil because of the improved consistency of the operation of the valve, a typical calibrated force for one type of transmission is 1.4 ounces and it has been found that providing the controls to within ten percent of the desired force level is readily achievable.

Although the invention has been described with respect to a specific preferred embodiment thereof, many variations and modifications will become apparent to those skilled in the art. For example, it may be desired to provide frangible tangs in the event that it is desired to remove a valve while obviating any danger of damaging the transmission housing. It is the intent that the appended claims be interpreted as broadly as possible in view of the prior art to include all such variations and modifications.

We claim:

1. An oil level control valve comprising a generally elongated base member having first and second opposite ends, a tang extending in a first direction from each end adapted to be received in respective bores formed in a transmission case cover, an oil receiving aperture formed in the base member, a post extending from the base member on two opposite ends of the aperture in a second direction opposite to that of the first direction, a cover member having first and second slots slidably receiving a respective post so that the cover member is movably mounted on the base member, an elongated strip of thermostatic material having two opposite ends and formed with a generally V-shaped force imparting portion intermediate its ends, the first end of the base member having spaced posts extending in the second direction each having at its distal free end a tab laterally extending toward each other, one end of the strip of thermostatic material received between the spaced posts and captured by the tabs with the force imparting portion aligned with the cover, the second end of the base member formed into a bracket having first and second spaced legs extending from the base in the second direction and being joined together by a transversely extending stop element, the second opposite end of the strip of thermostatic material received between the spaced legs and beneath the transversely extending stop element, the legs being bendable to adjustably vary the position of the transversely extending stop element to provide a selected amount of force, at a given temperature, exerted by the V-shaped force imparting portion on the cover.

2. An oil level control valve according to claim 1 in which the strip of thermostatic material and the base are generally coextensive in length and the two opposite ends of the strip are recessed to provide access to the base in alignment with the tangs.

3. An oil level control valve according to claim 1 in which the one end of the strip of thermostatic material is formed with a reduced width portion for reception between the spaced posts.

4. An oil level control valve according to claim 2 in which the one end of the strip of thermostatic material is formed with a reduced width portion for reception between the posts.

5. An oil level control valve according to claim 1 in which the transversely extending stop element includes a centrally disposed downwardly extending member and the second opposite end of the strip of thermostatic material has first and second fingers extending in the direction of the length of the strip received on opposite sides of the downwardly extending member.

6. An oil level control valve according to claim 5 including first and second tabs extending laterally from the distal end portion of the downwardly extending member to limit downward movement of the fingers.

7. An oil level control valve according to claim 6 in which the strip of thermostatic material and the base are generally coextensive in length and the two opposite ends of the strip are recessed to provide access to the base in alignment with the tangs.

* * * * *